C. F. PRITCHARD.
PICTURE PUZZLE.
APPLICATION FILED FEB. 14, 1916.
1,217,632.
Patented Feb. 27, 1917.
3 SHEETS—SHEET 1.
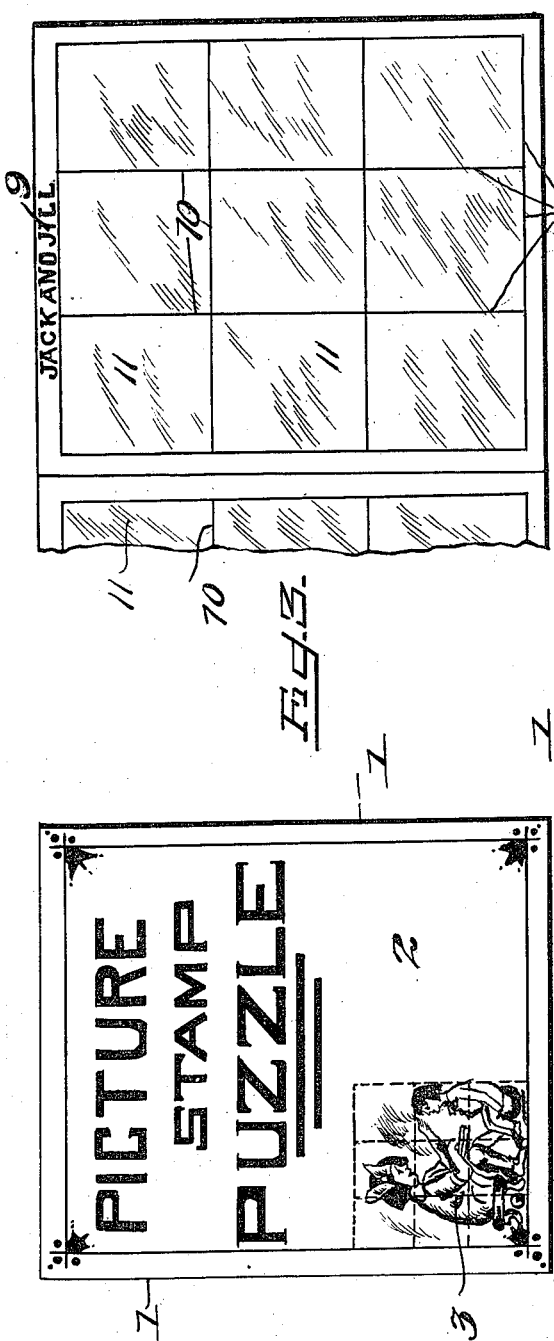
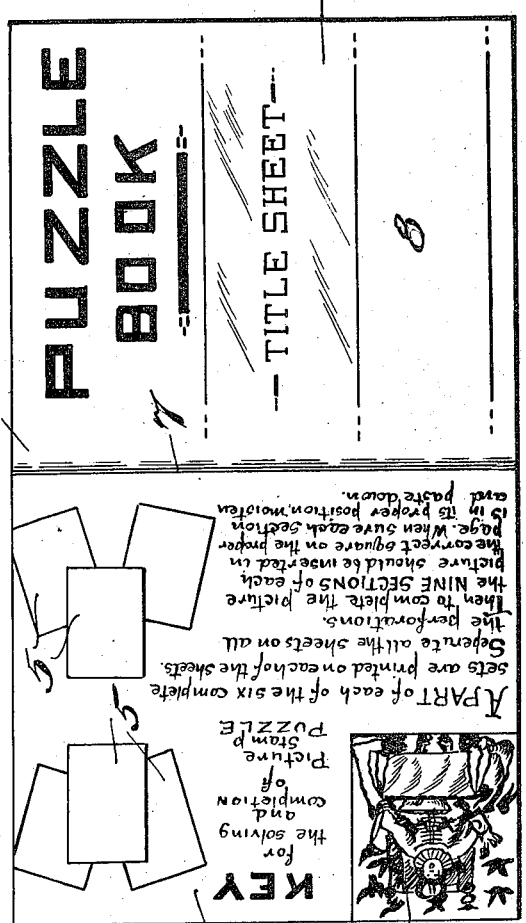
*INVENTOR.*
Clarence F. Pritchard

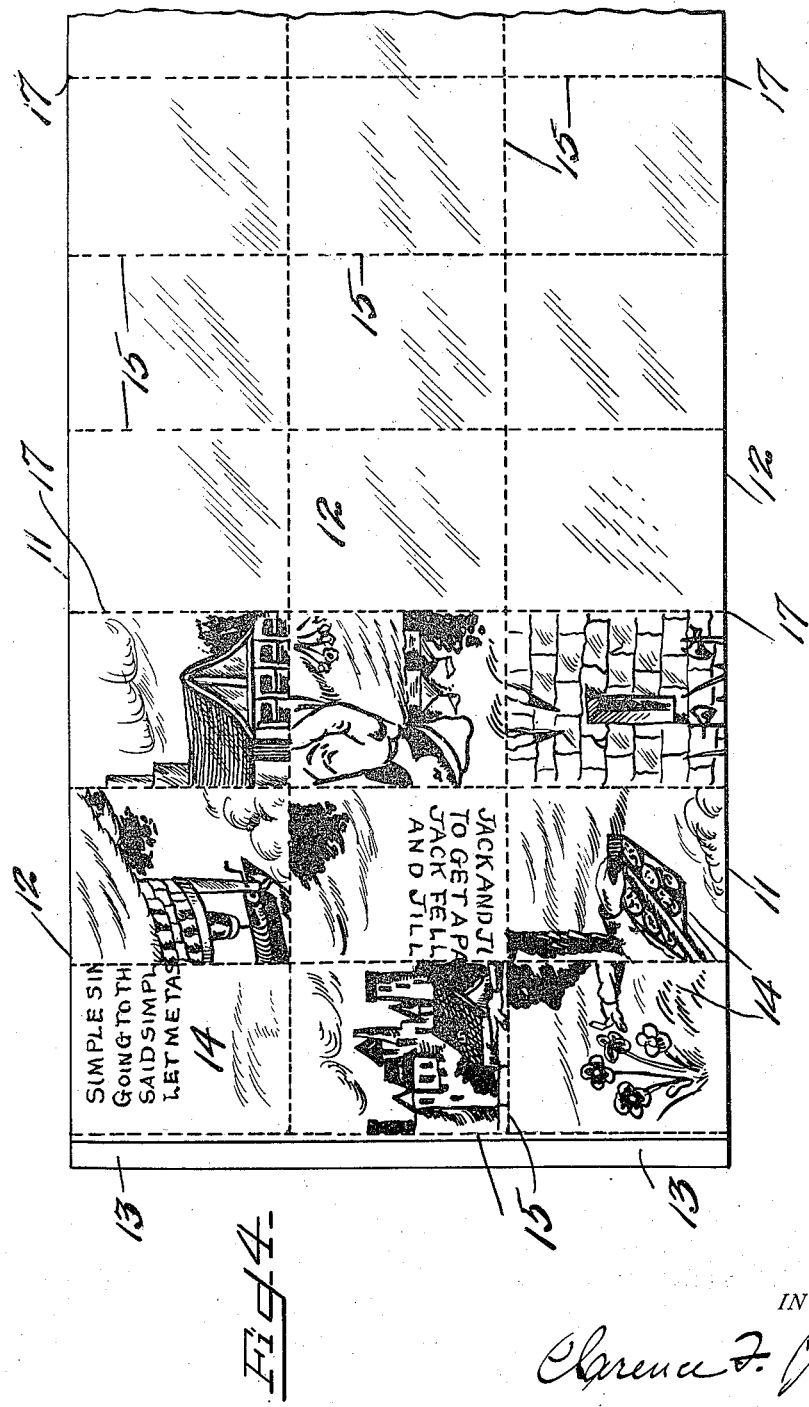

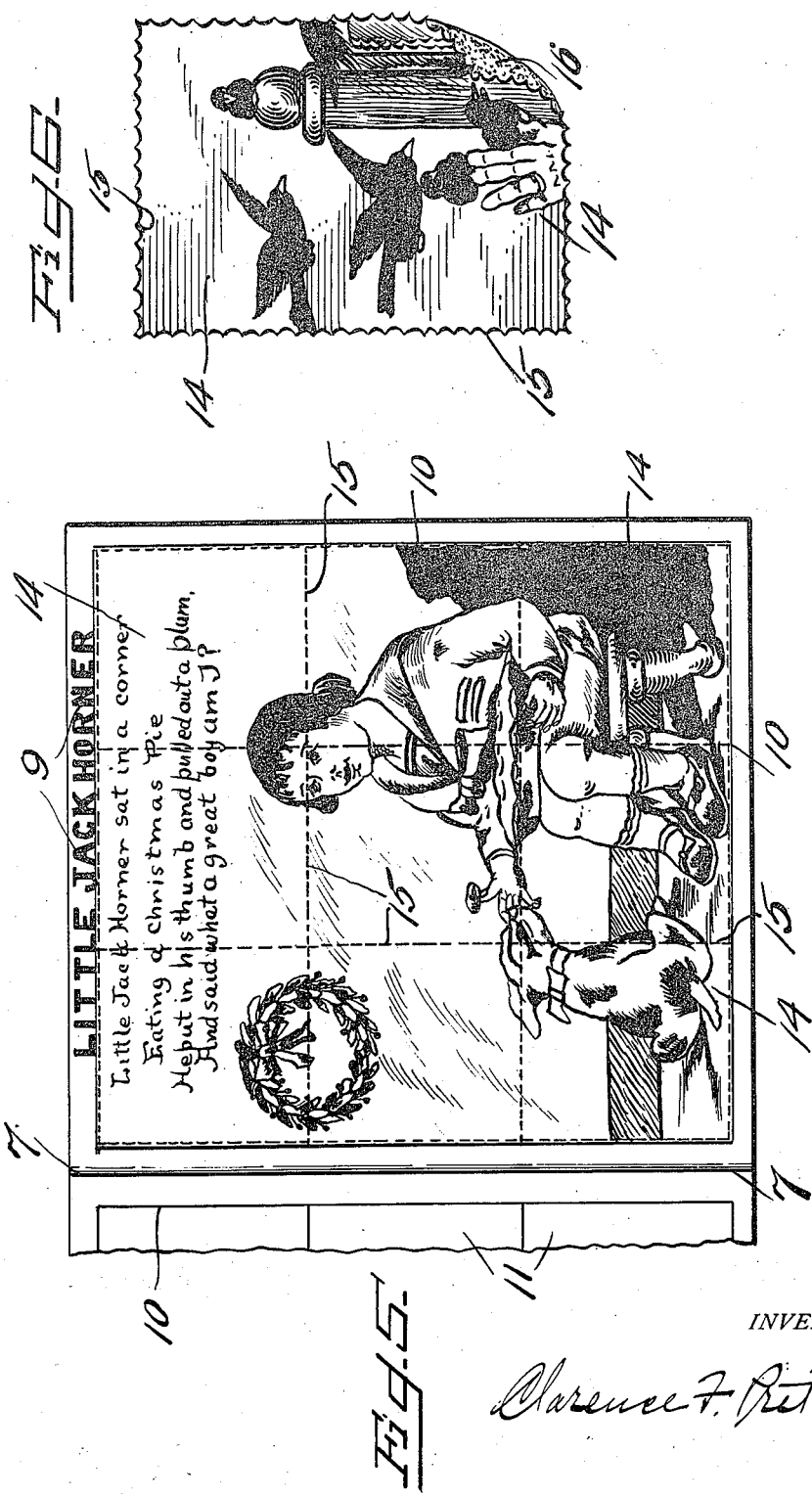

UNITED STATES PATENT OFFICE.

CLARENCE F. PRITCHARD, OF NEW YORK, N. Y.

PICTURE-PUZZLE.

1,217,632.      Specification of Letters Patent.      Patented Feb. 27, 1917.

Application filed February 14, 1916. Serial No. 78,302.

*To all whom it may concern:*

Be it known that I, CLARENCE F. PRITCHARD, a citizen of the United States, residing at New York city, county of New York, and State of New York, have invented certain new and useful Improvements in Picture-Puzzles, of which the following is a specification.

The invention relates to improvements in picture puzzles and has particular reference to a picture stamp puzzle comprised of a plurality of picture parts arranged fortuitously in a pane or sheet and preferably perforated and gummed like stamps, so that the parts may be separated from each other and reassembled in proper association upon a suitable surface, thereby forming the pictures from the patch-work of the sheet. In the preferred embodiment of the invention herein illustrated, the patch-work sheet or sheets are combined as an insertion with a book, on the permanent pages of which, suitably subdivided and entitled, the picture parts are pasted to form the completed pictures.

In the drawings Figure 1 is a face elevation of the booklet having indicated on its face a form of picture, and if desired, its title; Fig. 2 is an elevation of the booklet open, having indicated on the inside of this cover page, the "key" or instructions of solving the puzzle, and a representation of the diverse puzzles the booklet contains, and the page opposite is the "title page" applicable for any suitable purpose; Fig. 3 illustrates one of the inside pages of the booklet having indicated thereon a series of spaces or squares and the title of a "rhyme" or picture; Fig. 4 is a face elevation of the sheet of confused gummed stamps before the same are separated from one another on the perforated lines, the entire sheet of which is pasted or otherwise fastened in the body of the book; Fig. 5 shows the solved puzzle picture of "Little Jack Horner" and verse, as it is attached to the page of that title and in the proper squares indicated for it, and Fig. 6 shows one of the individual poster stamps, the subject matter of which indicates its forming part of the rhyme "Sing a song of sixpence" illustrating the manner in which their backs are gummed for attachment to the assemblage page.

Similar numerals of reference indicate similar parts throughout the several views.

In the drawings (1) indicates the booklet provided with a cover page (2) having indicated thereon the words "Picture stamp puzzle" and the portrayal of a picture (3), and surrounded with any attractive design; (4) designates the "key" or descriptive data explanatory of the solution of the picture puzzle, and has associated therewith indicative squares (5) of a series of pictures, and an illustration of one form of solved puzzle picture (6). The booklet is provided with a fold (7) at its center where the respective pages are fastened together and the opposite page of the "key" page is shown as the "title sheet" or page (8) whereon may be depicted any desired descriptive data or its space utilized for advertising purposes. The remaining pages of the booklet have printed thereon diverse titles (9) and rulings (10) dividing each sheet up into nine separate and distinct squares (11); (12) indicates a sheet provided with a flap (13) which attaches it to the fold (7) in booklet (1), and is divided up into fifty-four separate and distinct parts of pictures (14) on the perforated lines (15). All of the segregated parts of said pictures or rhymes are arranged in the sheet in a fortuitous manner "up side down" and otherwise, and are to be separated from one another by tearing them apart on said perforated lines. The back of each picture or rhyme element is gummed at (16) for attaching the same to the proper square (10) on the proper title page and in the proper position with relation to the other parts of the picture to be solved.

Sheet (12) is folded back on itself every third series of picture parts in order to fit properly within the cover of the booklet (1) at line of perforations (17). In Fig. 4 there is shown a series of picture and verse parts representing the following nursery rhymes with verse "Simple Simon", "Jack and Jill" "Tom, Tom, the piper's son", "Humpty Dumpty", one or more of each picture, and in Fig. 5 of the drawings there is shown a completely solved puzzle stamp picture representing "Little Jack Horner".

The picture puzzle is not only entertaining, and instructive to children, and even to adults, as the theme and the puzzle may be varied and rendered as difficult as desired. Then again the invention is applicable for an advertising medium, as the pictures to be assembled can display the names of advertisers, their articles of manufacture, etc.

It is obvious that the forms and means shown and described may be greatly varied without departing from the spirit of the invention.

What I claim and desire to secure by Letters Patent of the United States is as follows:

1. A device of the character described, comprising a book with a detachable leaf insertion comprising sections separable one from another by perforated lines, each section having designated thereon a picture part or a verse part or both, the parts being fortuitously arranged, and a plurality of pages with spaces whereon to assemble said parts in proper association.

2. A device of the character described, comprising the combination of a book having pages divided into spaces and bearing the titles of pictures or themes, and a mixed collection of picture parts such as to form a plurality of pictures when properly assembled, said picture parts being in sheet form, perforated and gummed like stamps, so that the unrelated parts may be separated from each other and affixed in proper association in the spaces of the pages of the book to form the pictures.

3. A device of the character described, comprising a book including a permanent part and a leaf or leaves comprising a mixed collection of picture or verse parts or both fortuitously associated in the sheet and separable from each other so that they may be assembled in proper association upon the permanent part of the book.

4. A picture puzzle comprising a sheet or sheets subdivided into a multiplicity of rectangular sections, each bearing a picture part, the parts being fortuitously arranged for the purpose of being separated and recombined.

5. In a picture puzzle, a pane or sheet of stamp-like picture parts, gummed and perforated and fortuitously arranged, for the purpose of being torn apart and recombined upon a suitable surface.

In testimony whereof I have hereunto signed my name in the presence of two subscribing witnesses.

CLARENCE F. PRITCHARD.

Witnesses:
J. HOWARD BREESE,
LOUELLA F. LITTLE.